R. D. PIKE.
MEANS FOR INDICATING THE DISPLAY OF MOTION PICTURES.
APPLICATION FILED JULY 17, 1916.
1,256,591.
Patented Feb. 19, 1918.
3 SHEETS—SHEET 1.
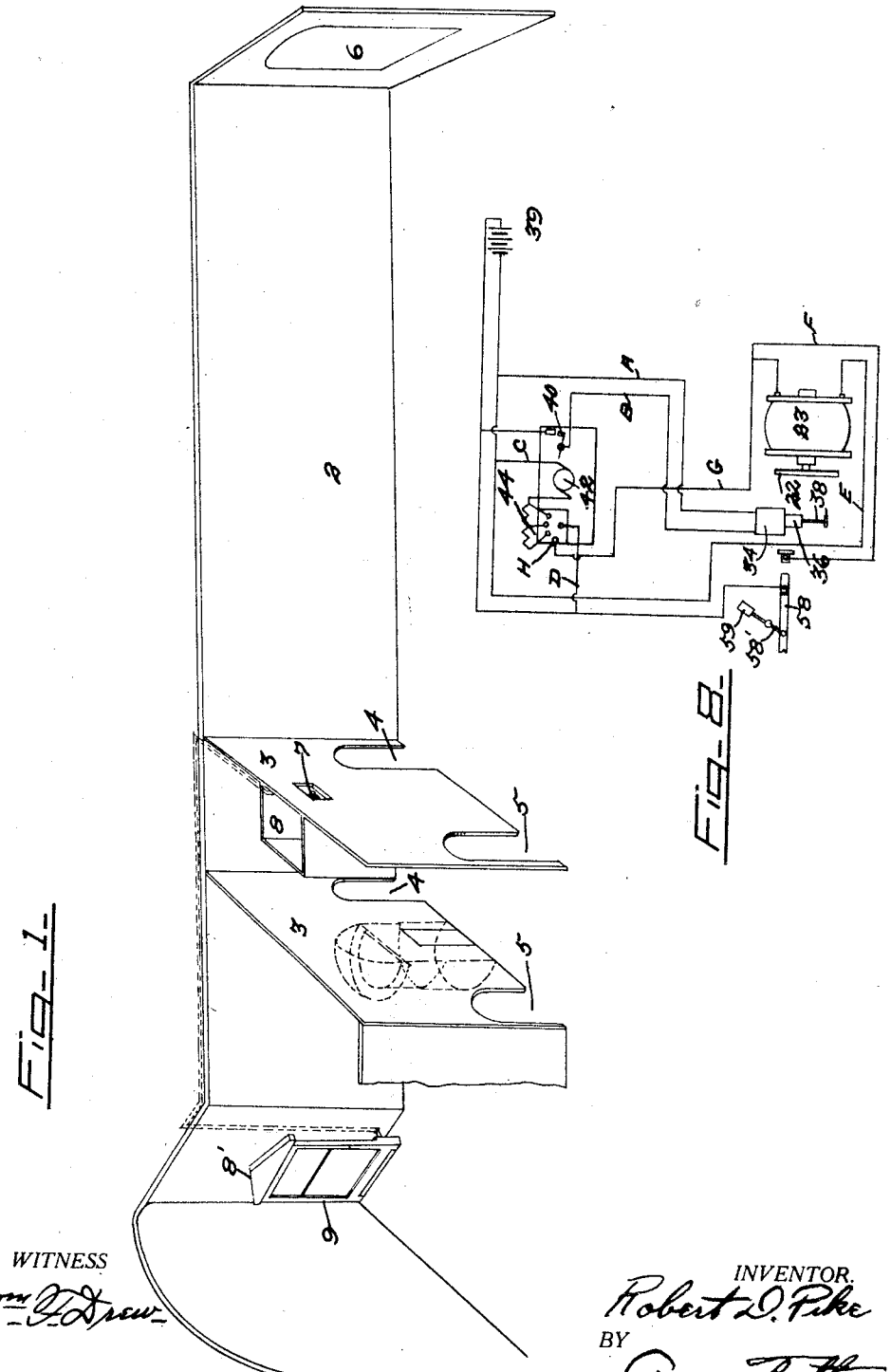
WITNESS
INVENTOR.
Robert D. Pike
BY
ATTORNEYS

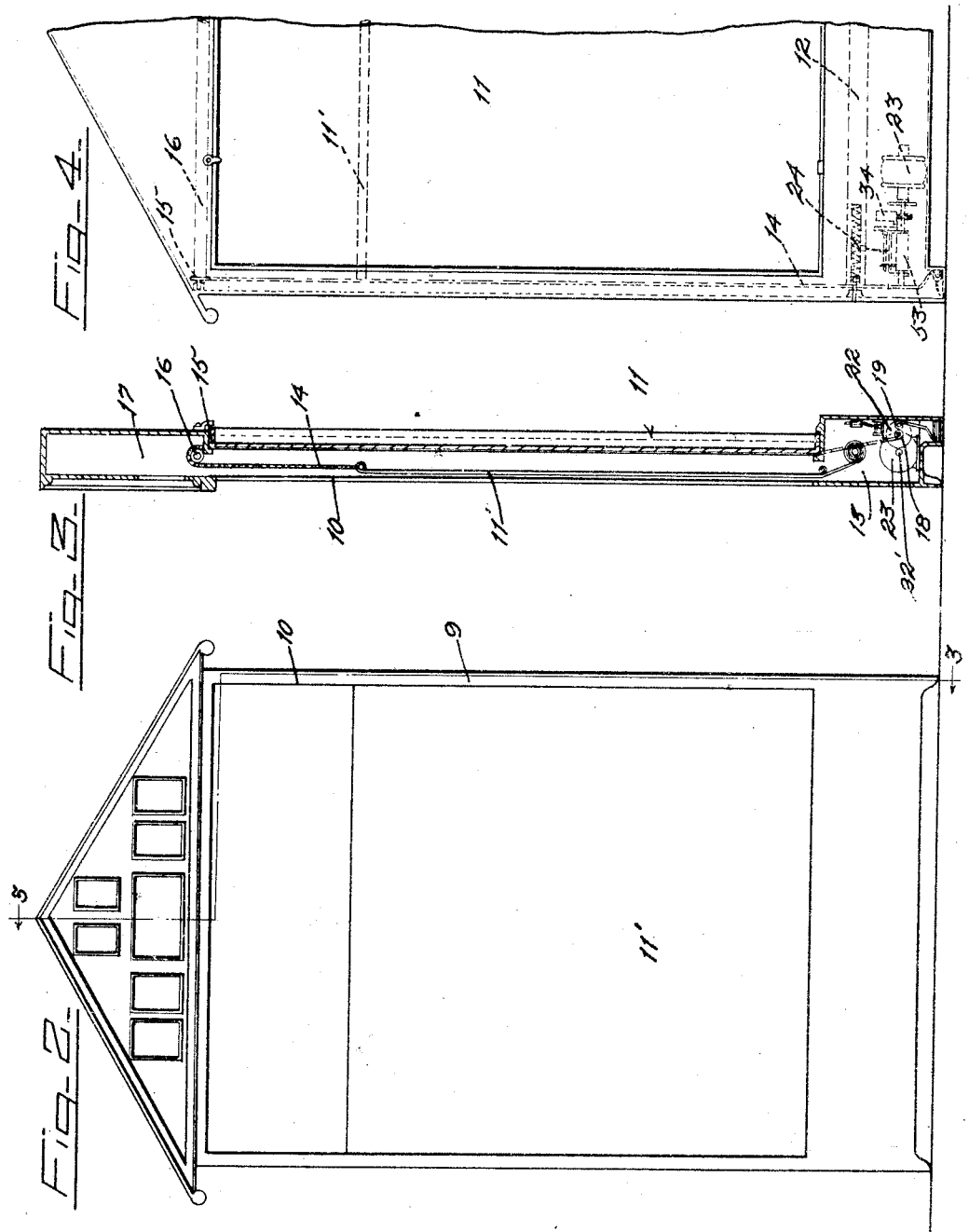

R. D. PIKE.
MEANS FOR INDICATING THE DISPLAY OF MOTION PICTURES.
APPLICATION FILED JULY 17, 1916.
1,256,591.
Patented Feb. 19, 1918.
3 SHEETS—SHEET 3.
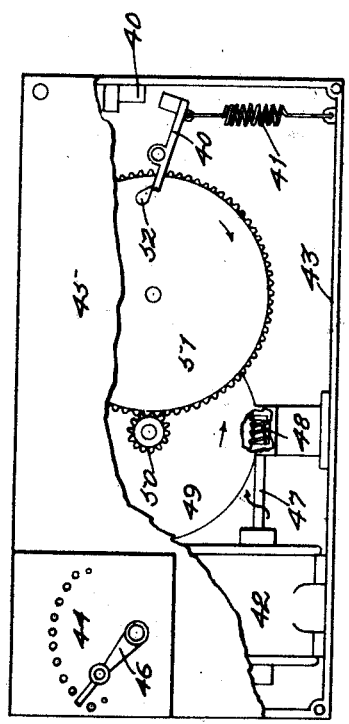
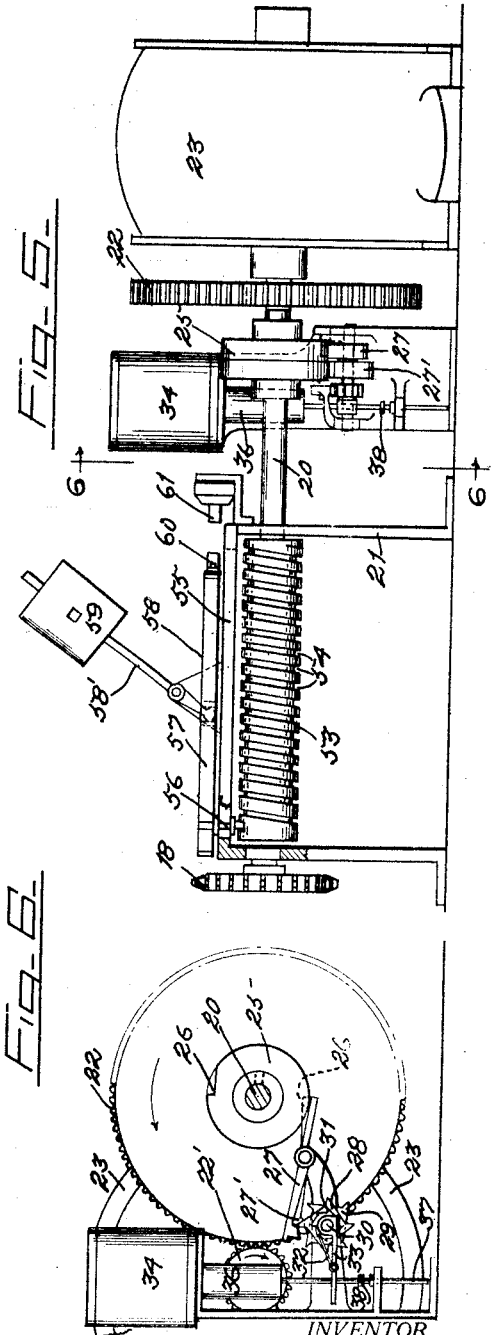
WITNESS
INVENTOR.
Robert D. Pike
BY
ATTORNEYS

UNITED STATES PATENT OFFICE.

ROBERT D. PIKE, OF SAN FRANCISCO, CALIFORNIA.

MEANS FOR INDICATING THE DISPLAY OF MOTION-PICTURES.

1,256,591.  Specification of Letters Patent.  Patented Feb. 19, 1918.

Application filed July 17, 1916. Serial No. 109,605.

*To all whom it may concern:*

Be it known that I, ROBERT D. PIKE, a citizen of the United States, residing at the city and county of San Francisco and State of California, have invented certain new and useful Improvements in Means for Indicating the Display of Motion-Pictures, of which the following is a specification.

In motion picture theaters operating what are termed continuous shows, and where what are commonly termed feature pictures are displayed, the patrons on entering the play house after the run of the picture has started, are not familiar with the character of and events which have taken place in the display of the picture prior to their arrival. Consequently, such patrons remain in the theater often through the display of runs of other pictures in which they are not interested, in order to view the displaying of the first part of the film run which was in progress when they entered.

Viewing a picture, particularly a feature picture play, in the above manner, is very unsatisfactory, as the story is broken and disconnected, and, as above stated, the patron in order to obtain a clear understanding of the same views the last part or ending of the same before the display of the beginning or first part; whereas, had these patrons upon entering been advised, by reading a printed synopsis or otherwise, of that portion of the picture run displayed prior to their arrival, they would on entering the theater and viewing the remaining portion of the picture as displayed, have the complete thread of the story from the beginning, and it would not require that they remain through several runs of other pictures in order to complete the thread of the picture of which they had seen only a portion displayed.

By providing a means operated in timed relation with the display of the pictures and whereby the patrons on arriving at the theater may be advised, in any manner, as by a synopsis, as to that portion of the picture displayed before their arrival, they, in the majority of cases, would not remain seated in the theater during the display of pictures in which they are not interested, in order to see displayed the first part of the picture which was displayed immediately prior to their entering, but would vacate the theater permitting others to enter, and thus increase the returns of the house.

The present invention relates to a means for indicating the display of motion pictures by positioning in front of the theater entrance, preferably in the lobby thereof, an apparatus which is operated in timed relation with the display of the pictures, and by which the patrons on arriving at the theater may know of the picture on display in the theater, and by reading a synopsis be advised of that portion of the story depicted by that portion of the picture displayed prior to their arrival, so that on entering and after the display of the remaining portion of the picture they will know the entire story though only having viewed a portion of it on the screen.

To more fully comprehend the invention, reference is directed to the accompanying drawings, wherein—

Figure 1 is an interior perspective view of a motion picture theater, illustrating the screen, the projector and operator's room, the entrances and lobby, an embodiment of my apparatus in the lobby and the controlling connections therefor leading into the operator's room, whereby the apparatus may be operated in timed relation with the display of the picture.

Fig. 2 is a view in elevation of an embodiment of my indicating device, for displaying in timed relation with the projection of the picture within the theater a synopsis thereof exterior of the theater entrance.

Fig. 3 is a sectional view taken on line 3—3 of Fig. 2.

Fig. 4 is a view in elevation of a portion of the rear of the indicating device, illustrating the mechanism for intermittently operating the screen or curtain.

Fig. 5 is a detail view in elevation of the curtain reversing motor and associated mechanism.

Fig 6 is a view in end elevation of the disclosure in Fig. 5.

Fig. 7 is a view in detail of the mechanism for intermittently operating the curtain.

Fig. 8 is a diagrammatic view of the wiring system connecting the various parts of the operating mechanism.

Referring more particularly to the several views of the drawings wherein like characters of reference designate corresponding parts, 1 indicates the lobby of a motion picture theater 2, the two being separated by one or more dividing walls 3 provided with the entrance and exit passages 4 and 5. On a suitable screen 6 are projected what are commonly termed motion pictures by a suitable projecting apparatus 7 positioned within an operator's booth or inclosure 8, preferably arranged at the outer side of one of the dividing walls 3, as in Fig. 1.

The indicating apparatus 8' which contains preferably the titles and a synopsis of the pictures displayed in their order of projection, is located at some suitable position in advance of the outer dividing wall 3, preferably in the lobby 1, as in the drawing, and for purposes of illustration the following apparatus is disclosed; it being understood, however, that any suitable apparatus may be employed for this purpose just so long as the same is intermitently operated in timed relation with the projection of the pictures on the screen within the theater.

The indicating apparatus comprises a frame 9 provided in its front with an opening 10, the frame being closed at its rear by a removable back 11 which is adapted to carry on its front face, so as to be visible through the opening 10, a printed synopsis of each picture, or, if desirable, only the feature picture projected on the screen, and the synopsis of different pictures being arranged in their order of projection. A suitable curtain 11' carried by a spring roller 12 positioned in the chamber 13 at the base of the frame 9 is adapted when raised to close the opening 10 and when intermittently lowered in a hereinafter described manner uncovers for reading by the theater patrons on entering the lobby, a synopsis of the projected picture and that portion of the picture now being shown which has been projected prior to their arrival. Suitable chains or other flexible connections 14 are secured to the free end of the curtain 11 at opposite sides of the opening 10 and operate over sprockets 15 carried by and rotatable with a shaft 16 mounted in the chamber 17 formed in the frame above the opening 10. The lower end of one of the chains 14 passes between and engages the toothed sprockets 18 and 19 in the chamber 13, the sprocket 18 being carried on a shaft 20 rotatable in and supported by a frame 21. The shaft 20 mounts a gear 22 and connects through the gear 22' with the armature of a motor 23 which when supplied with current operates to raise the curtain when desired, and the armature of said motor when the current is off is free to rotate by the operation of the spring 24 in the curtain supporting roller 12, when the curtain is being intermittently lowered in a hereinafter described manner.

The spring roller 12 is permitted to intermittently wind by the following mechanism: Mounted on the shaft 20 are cam disks 25 formed on their peripheries with the respective shouldered recesses 26 and 26', the disks being arranged so that said recesses will be disposed at diametrically opposite sides of the shaft, as in Fig. 6. Coöperating with said recesses are the pivoted pawls 27 and 27' actuated in alternation by the rotatable cam surfaces 28 and 29 arranged in staggered relation to each other on a shaft 30, about which they rotate. A ratchet 31 is fixed to rotate with the cam surfaces 28 and 29 and the same is operated by a spring pawl 32 carried by an arm 33 mounted to oscillate on the shaft 30. A solenoid 34 is carried by a frame 35 and coöperating with said solenoid is a vertically movable armature 36 carrying the extension 37 provided with a collar 38 which is at a point beneath the free end of the arm 33. The solenoid 34 connects with a battery 39 through the leads A and B and in the lead B is mounted a suitable intermittently operated snap switch 40 which is normally retained in open position by the spring 41.

The switch 40 and the following described operating mechanism therefor is preferably positioned in the operator's booth or inclosure 8, so that they will be within easy reach of the operator to be regulated to operate the curtain in timed relation with the projection of the pictures on the screen. A motor 42 mounted in the casing 43 is connected in circuit with the battery 39 through the leads C and D and a variable speed control 44 positioned preferably on the cover 45 of the casing 43, and the handle 46 of said control is manually operated and within easy reach of the projector attendant. The motor shaft 47 connects through a worm 48, gear 49, and pinion 50 with a rotating disk 51 which mounts a pin or finger 52, adapted on each revolution of the disk in the direction of the arrow—Fig. 7, to actuate the switch 40 to complete the circuit between the battery 39 and solenoid 34. On each closure of the switch 40 the solenoid 34 is energized to raise the armature 36 and the upward movement of the armature lifts the arm 33, which, through the pawl 32 and ratchet 31 revolves the cam surfaces 28 and 29 which in turn operates to release the pawl 27' from its shouldered recess 26, permitting the shaft 20 to be rotated a one-half revolution by the action of the spring 24 of the roller 12. Each one-half revolution of the shaft 20 permits of a uniform intermittent drop or lowering of the curtain 11' for exposing a succeeding line or lines of the printed synopsis for reading through the opening 10. The rotation of the shaft 20 in turn rotates a cylinder 53 carried thereby and which is spirally grooved as at 54. Slidably mounted in a slot 55 in the frame 21 is a switch controlling pin 56 which seats at its lower end in the groove 54 and at its upper end operates in a slot 57 in the movable switch member 58 mounted to reciprocate longitudinally of the upper portion of the frame 21. A pivotally mounted lever 58' carrying at its upper end the adjustable weight 59, coöperates at its lower end with the movable switch member 58, and causes a rapid operation of said movable member after the pin 56 has contacted with either end of the slot 57 and reciprocated said member 56 to raise the lever to a point beyond a vertical position in its direction of movement. The movable switch member 56 carries on one end a contact 60 which is adapted on the throw of the movable switch member, when the curtain is in its lowermost position and exposing the synopsis of the picture displayed, to coöperate with a stationary contact 61 carried by frame 21. The motor 23 is connected to battery 39 through leads E and F, the lead F being broken and coöperating portions being connected respectively to the movable contact 60 and stationary contact 61. It will be observed by viewing Fig. 8 that the throw of the movable switch member 56 to cause the engagement of the contacts 60 and 61 completes the circuit between the battery and motor, and causes the operation of the motor to rotate shaft 20 in the direction of the arrow—Fig. 6 to raise the curtain. During this movement of the shaft the pawls 27 and 27' ride freely over their coöperating shouldered depressions 26 and 26' and the pin 56 travels to the opposite end of the groove 54 in the cylinder 53, and on reaching the end of the groove actuates the movable switch member 58 to separate the contacts 60 and 61, interrupting the motor circuit and stopping the motor. At this time the curtain 11' will be in raised position to conceal or cover the synopsis within the frame until such time as the picture run is again started, and at such time the projector operator or attendant adjusts the controlling handle 46 of the variable control to permit the operation of the curtain lowering mechanism to operate in timed relation with the operation of the projector to uncover the synopsis of the picture as projected on the screen.

To permit the raising of the curtain 11' any desired distance or at any desired time, a lead G connects at one end with lead F of the motor circuit and connects at its opposite end with the contact button H on the panel of the variable control, and the attendant or operator by moving the control lever 46 into contact with the button H, completes a circuit from the motor through leads F, G and D to the battery 39, which operates the motor as above described to raise the curtain.

I have illustrated and described a motion picture theater provided with means positioned exteriorly of the entrance thereof and for containing preferably a printed synopsis of the feature picture or run of pictures displayed or projected on the screen within the theater, and have provided means for operating in timed relation with the display of the pictures or picture run within the theater which discloses successive portions of the synopsis as the picture relating thereto is projected on the screen, the synopsis as exposed remaining in view through the entire projection of the pictures or picture run.

Having thus described my invention, what I claim as new and desire to protect by Letters Patent is:—

1. In combination with a theater for the display of motion pictures, a member for positioning exteriorly thereof and for containing a synopsis of the picture to be projected, and means associated with said member and adapted for operation in timed relation with the display of the picture within the theater, for presenting to view successive portions of the synopsis as the portions of said picture corresponding therewith are displayed within the theater.

2. In combination with a theater for the display of motion pictures, of means positioned exteriorly thereof for containing a synopsis of the picture to be projected, and means associated therewith and adapted to be intermittently operated in timed relation with the display of the picture within the theater, for intermittently presenting to view successive portions of said synopsis as the portions of said picture corresponding therewith are displayed within the theater.

3. In combination with a theater for the display of motion pictures, of a stationary member for positioning exteriorly thereof and for containing a synopsis of the picture to be projected within the theater, and a movable curtain associated with said member and adapted for operation in timed relation with the display of the picture within the theater, for presenting to view successive portions of said synopsis as the portions of the picture corresponding therewith are displayed within the theater.

4. In combination with a theater for the display of motion pictures, of a stationary member for mounting a synopsis of the picture to be displayed within the theater, a movable curtain adapted to normally conceal said synopsis from view, and means associated with said curtain and adapted for operating in timed relation with the display of the picture within the theater for moving said curtain relatively to said member for presenting to view successive portions of the synopsis as the portions of said film corresponding therewith are displayed within the theater.

5. In combination with a theater for the display of motion pictures, a member for containing a synopsis of the picture to be projected, and means associated with said member and for operation in timed relation with the display of the picture for presenting to view successive portions of the synopsis as the portions of said picture corresponding therewith are displayed, said means adapted for operation to conceal said successive exposed portions of said synopsis from view after a complete exposure of the picture.

6. In combination with a theater for the display of motion pictures, of a stationary member for mounting a synopsis of the picture to be displayed within the theater, a movable curtain adapted to normally conceal said synopsis from view, means associated with said curtain and adapted for operating in timed relation with the displaying of the picture within the theater for moving said curtain relatively to said member for presenting to view successive portions of the synopsis as the portions of said film corresponding therewith displayed within the theater, and means for returning the said curtain to normal position on the completion of the exposure.

7. In combination with a theater for the display of motion pictures, of a stationary member for positioning exteriorly thereof and for containing a synopsis of the picture to be projected within the theater, said synopsis adapted to be successively displayed in timed relation with the display of the picture within the theater for presenting to view successive portions of said synopsis as the portions of the picture corresponding therewith are displayed within the theater, said successive exposed portions of said synopsis remaining in view until such time as a complete exposure of the picture is made, said exposed synopsis adapted to be concealed from view after the complete exposure of the picture.

In testimony whereof I have signed my name to this specification in the presence of a subscribing witness.

ROBERT D. PIKE.

Witness:
D. B. RICHARDS.

Copies of this patent may be obtained for five cents each, by addressing the "Commissioner of Patents, Washington, D. C."